(12) United States Patent
Brown et al.

(10) Patent No.: US 7,466,514 B2
(45) Date of Patent: Dec. 16, 2008

(54) CONTROL SYSTEM TO REGULATE THE CONCENTRATION OF VAPOR IN A HARD DISK DRIVE

(75) Inventors: Charles A. Brown, San Jose, CA (US); Thomas E. Karis, Aromas, CA (US); Sharon Lum, San Jose, CA (US); Scott McCoy, Pleasanton, CA (US); Run-Han Wang, San Jose, CA (US); Herman R. Wendt, San Jose, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 478 days.

(21) Appl. No.: 11/399,079

(22) Filed: Apr. 6, 2006

(65) Prior Publication Data

US 2007/0236829 A1   Oct. 11, 2007

(51) Int. Cl.
*G11B 33/14* (2006.01)
(52) U.S. Cl. .................................................. 360/97.02
(58) Field of Classification Search .............. 360/97.02, 360/97.03
See application file for complete search history.

(56) References Cited

U.S. PATENT DOCUMENTS

| | | | |
|---|---|---|---|
| 4,789,913 A | 12/1988 | Gregory et al. | |
| 5,202,803 A | 4/1993 | Albrecht et al. | |
| 5,229,899 A * | 7/1993 | Brown et al. | 360/97.02 |
| 5,309,301 A | 5/1994 | Gregory et al. | |
| 5,331,487 A | 7/1994 | Gregory et al. | |
| 6,643,093 B2 | 11/2003 | Brown et al. | |
| 7,362,540 B2 * | 4/2008 | Repphun et al. | 360/97.02 |
| 7,365,937 B2 * | 4/2008 | Gunderson | 360/97.02 |
| 2003/0179490 A1 | 9/2003 | Matsumoto et al. | |
| 2004/0095668 A1 | 5/2004 | Feliss et al. | |

* cited by examiner

*Primary Examiner*—Angel A. Castro
(74) *Attorney, Agent, or Firm*—Patterson & Sheridan, L.L.P.

(57) ABSTRACT

A method and apparatus for regulating the concentration of a vapor within a hard drive are provided. In one embodiment, the method may include providing a source chemical of a vapor in a first cavity formed within a first object, providing an absorptive chemical which absorbs the vapor in a second cavity formed within the first object, and providing a third cavity formed by a hard drive housing of the hard drive. A first conductance path having a first conductance connects the first cavity to the third cavity, a second conductance path having a second conductance connects the second cavity to the third cavity, and the first conductance and the second conductance maintain a partial pressure level of the vapor within the third cavity.

25 Claims, 4 Drawing Sheets

CONTROL SYSTEM TO REGULATE THE CONCENTRATION OF VAPOR IN A HARD DISK DRIVE

BACKGROUND OF THE INVENTION

1. Field of the Invention

Embodiments of the present invention generally relate to regulating the concentration of vapors within a hard drive.

2. Description of the Related Art

Modern computer systems typically include a hard drive for storage of information. Information may be stored in one or more magnetic disks within a hard drive housing. A magnetic read/write head may also be provided within the hard drive housing to read the stored information from a magnetic disk. The read/write head may be actuated via an arm over the magnetic disk as the magnetic disk spins underneath the read/write head, thereby allowing different information stored on the magnetic disk to be accessed via the read/write head.

In order to increase the capacity of the hard drive (e.g., to increase the amount of information stored by the hard drive) the read/write head may be suspended at a short distance (referred to as the fly height) from the surface of the magnetic disk. Because of the short distance between the read/write head and because of the density of information stored on the magnetic disk, the components within the hard drive housing may be sensitive, for example, to moisture, contaminants, and other impurities and imperfections within the hard drive housing.

In some cases, to improve the operating conditions of the components within the hard drive housing, a chemical may be placed within the hard drive housing which provides a vapor with beneficial properties (e.g., a vapor which prevents corrosion) to improve operation of components within the hard drive housing. Where such a vapor is present within the hard drive housing, there may be a desire to regulate the concentration of the vapor to provide the most benefit to components within the hard drive housing. For example, if the concentration of the vapor within the hard drive housing is so great that the mix of gasses in the hard drive housing becomes saturated with the vapor, the vapor may condense, decreasing the benefit derived from the vapor and possibly interfering with correct operation of the components within the hard drive housing.

In general, the operating conditions (e.g., temperature, gas pressure) within the hard drive housing fluctuate, for example, depending on use of the hard drive and ambient conditions outside of the hard drive housing. Where the operating conditions within the hard drive housing fluctuate, regulation of the vapor concentration within the hard drive housing may become more difficult (e.g., the vapor concentration may also fluctuate depending on the operating conditions within the hard drive housing).

Accordingly, what is needed are an improved method and apparatus for regulating the concentration of a vapor within a hard drive.

SUMMARY OF THE INVENTION

The present invention generally provides a method and apparatus for regulating the concentration of a vapor within a hard drive. In one embodiment, the method may include providing a source chemical of a vapor in a first cavity formed within a first object, providing an absorptive chemical which absorbs the vapor in a second cavity formed within the first object, and providing a third cavity formed by a hard drive housing of the hard drive. A first conductance path having a first conductance connects the first cavity to the third cavity, a second conductance path having a second conductance connects the second cavity to the third cavity, and the first conductance and the second conductance maintain a partial pressure level of the vapor within the third cavity.

Embodiments of the invention also provide a hard drive including a first cavity formed within a first object, wherein the first cavity includes a source chemical which provides a vapor, a second cavity formed within the first object, wherein the second cavity includes an absorptive chemical which absorbs the vapor, and a hard drive housing including a third cavity formed within the hard drive housing. The hard drive also includes a first conductance path between the first cavity and the third cavity, wherein the first conductance path has a first conductance and a second conductance path between the second cavity and the third cavity, wherein the second conductance path has a second conductance, and wherein the first conductance and the second conductance maintain a partial pressure level of the vapor within the third cavity.

Embodiments of the invention also provide a hard drive comprising a source/drain unit. The source/drain unit includes a first cavity formed within the source/drain unit, wherein the first cavity includes a chemical which provides a corrosion inhibiting vapor, and a second cavity formed within the source/drain unit, wherein the second cavity includes an activated carbon which absorbs the corrosion inhibiting vapor. The hard drive also includes a hard drive housing including a third cavity formed within the hard drive housing, a first conductance channel between the first cavity and the third cavity, wherein the first conductance path has a first conductance, and a second conductance channel between the second cavity and the third cavity, wherein the second conductance path has a second conductance, and wherein the first conductance and the second conductance maintain a partial pressure level of the corrosion inhibiting vapor within the third cavity.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and, unless explicitly present, are not considered elements or limitations of the appended claims.

The present invention generally provides a method and apparatus for regulating the concentration of a vapor within a hard drive. In one embodiment, the method may include providing a source chemical of a vapor in a first cavity formed within a first object, providing an absorptive chemical which absorbs the vapor in a second cavity formed within the first object, and providing a third cavity formed by a hard drive housing of the hard drive. A first conductance path having a first conductance connects the first cavity to the third cavity, a second conductance path having a second conductance connects the second cavity to the third cavity, and the first conductance and the second conductance maintain a partial pressure level of the vapor within the third cavity. Using the first and second conductance to maintain the partial pressure level of the vapor within the third cavity may, for example, provide a desired partial pressure of the vapor independent of the operating conditions (e.g., independent of the temperature) or the hard drive.

Hard Drive Overview

Figure 1:
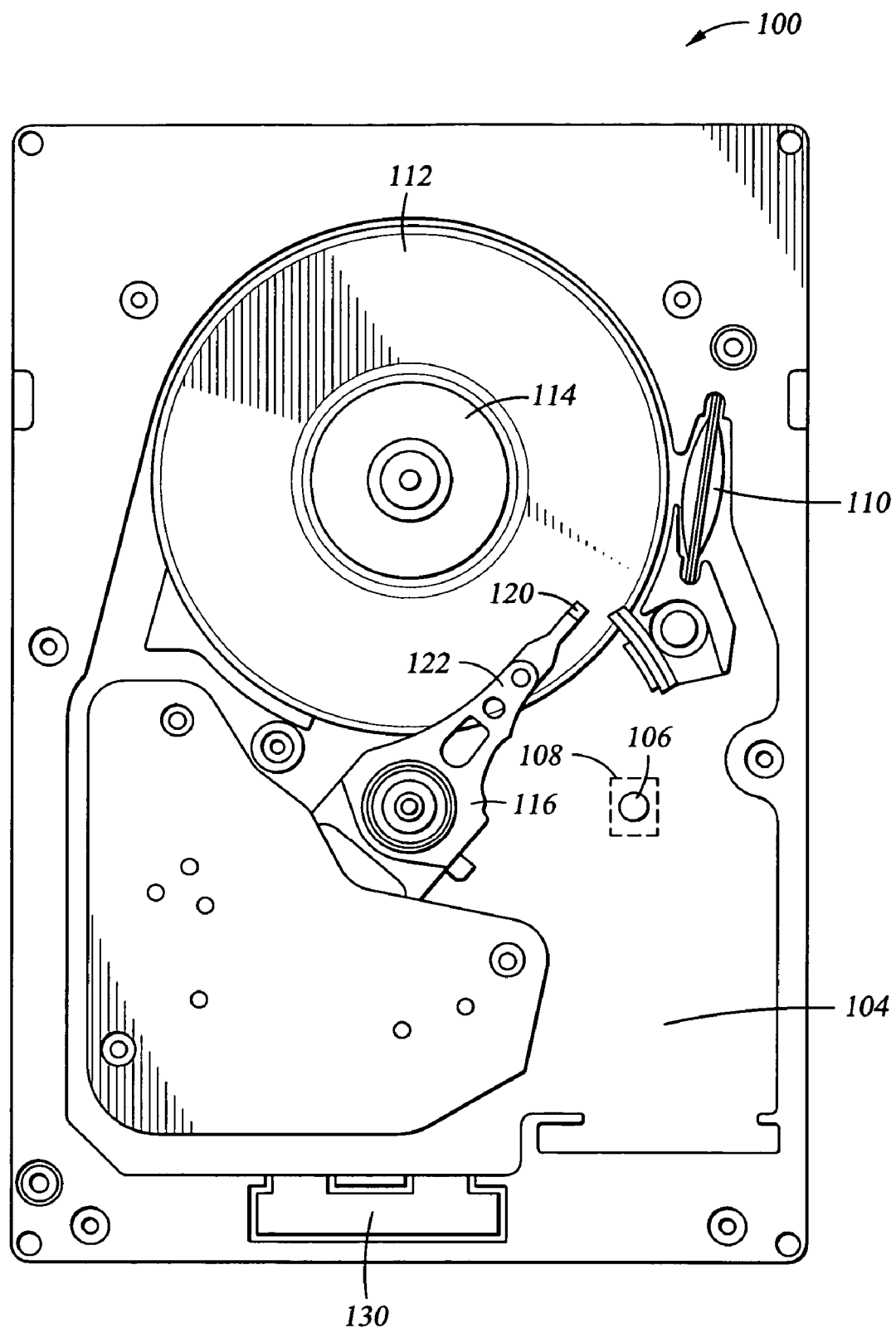
FIG. 1 is a diagram depicting a hard drive according to one embodiment of the invention.

FIG. 1 illustrates a hard drive 100 according to one embodiment of the invention. The hard drive 100 may include a hard drive housing 102 with a interior cavity 104 that includes a magnetic media hard disk 112 mounted upon a motorized spindle 114. An actuator arm 116 is pivotally mounted within the hard drive 100 with a slider 120 disposed upon a distal end 122 of the actuator arm 116. During operation of the hard drive 100, the hard disk 112 rotates upon the spindle 114 and the slider 120 acts as an air bearing surface (ABS) adapted for flying above the surface of the disk 112. The slider 120 may include a substrate base upon a magnetic reader and writer are fabricated.

In some cases, the hard drive housing 102 may include one or more breather holes 106 which extend between the interior cavity 104 and the exterior of the hard drive housing 102. A breather filter may cover the breather hole 106 thereby allowing air to flow between the exterior of the hard drive housing 102 and the interior cavity 104 while preventing contaminants (e.g., dust particles) from entering the interior cavity 104. Optionally, in some cases, the hard drive housing 102 may be hermetically sealed. The hard drive housing 102 may also include an interior recirculating filter 110 which may be used to filter air circulating within the interior cavity 104 due to rotation of the hard disk 112. As described in greater detail below, the housing 102 may also include a source/drain unit 130 for regulating concentration of a vapor within the interior cavity 104.

An Exemplary Source/Drain Unit

Figure 2A:
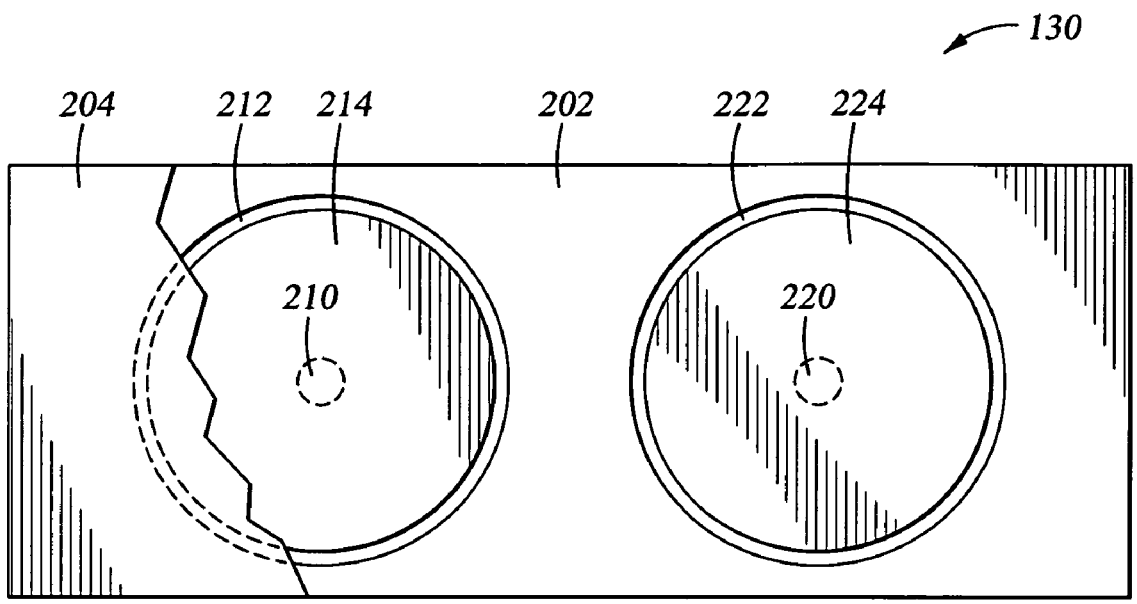
FIGS. 2A and 2B are diagrams depicting a front and a top view, respectively, of a source/drain unit according to one embodiment of the invention.
Figure 2B:
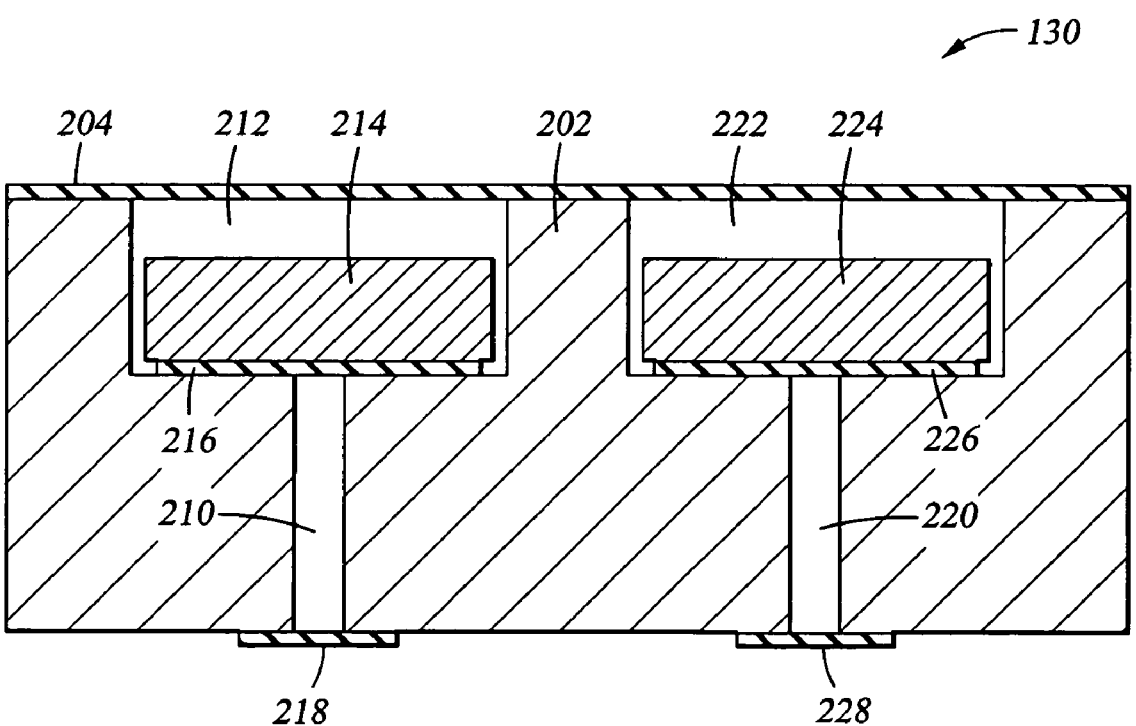

FIGS. 2A and 2B are diagrams depicting a front and a top view, respectively, of a source/drain unit 130 according to one embodiment of the invention. As depicted, the source/drain unit 130 may include a source/drain unit body 202 with a first cavity 212 and a second cavity 222. A first channel 210 and a second channel 220 may connect the first cavity 212 and the second cavity 222, respectively, to the exterior of the source/drain unit 130.

In one embodiment, the first cavity may contain a source chemical 214 which provides a vapor to the interior cavity 104 of the hard drive housing 102. Also, the second cavity may contain an absorptive chemical 224 which acts to absorb vapors within the interior cavity 104 of the hard drive housing 102. As described below, a first conductance of the first channel 210 and the second channel 220 may be used to regulate the amount of vapor (as measured, for example, by a partial pressure and/or concentration of the vapor) within the inner cavity 104 due to the source chemical 214.

The source chemical 214 may provide a variety of desired vapors. In one embodiment, the source chemical 214 may provide a vapor phase corrosion inhibitor (VCI) which mitigates corrosion of the read/write head and/or hard disk 112. For example, the source chemical 214 may be a benzotriazole, alone or in combination with substituted benzotriazoles. Thus, the source chemical 214 may be benzotriazole (BTA), 5 methyl benzotriazole (5M BTA), 4 methyl benzotriazole (4M BTA), a mixture of 4M BTA and 5M BTA, or other mixtures of BTA, 4 M BTA, and 5M BTA. The source chemical may also be cyclohexylammonium nitrite, dicyclohexyammonium benzoate, or octafluoro-1,6-hexandiol.

In one embodiment, the source chemical 214 may provide a lubricity enhancing compound. For example, the source chemical 214 may be a volatile fluorine containing compound or a volatile organic material of amphiphilic nature. Exemplary fluorine containing compounds may include perfluoropolyethers with various terminating end groups, such end groups including but not limited to $OC(n)F(2n+1)$, OR, where R is an aliphatic or aromatic compound, and OH, at one or both ends, such as ZDol 2000, which has OH termination at both ends, and X, Y and Z type fluids with perfluoromethyl termination at both ends. Exemplary volatile organic materials of amphiphilic nature may include docosanoic acid, docosanol, or tricosanoic acid.

In one embodiment, the source chemical 214 may provide a smear suppressing compound. A smear is an imperfection which sometimes appears on the surface of a hard disk 112 and which may causes errors in accessing data stored on the hard disk. The smear suppressing compound may work to reduce such smears and thereby improve reliability of the disk drive 100. The smear suppressing compound may include volatile fluorine containing compound, such as, for example, ZDol 1000, Z03, Z15, or fractionated narrow volatility subsets thereof.

In some cases, the source chemical 214 may provide multiple beneficial vapors, or vapors with multiple beneficial properties. For example, in one embodiment, the source chemical 214 may provide both lubricity enhancement and smear suppression. Also, in some cases, separate source chemicals may be provided in separate cavities to achieve a desired combination of vapors within the hard drive housing 102.

With respect to the absorptive chemical 224, the absorptive chemical 224 may absorb a variety of vapors and may be an organic or fluorine containing vapor absorber. The absorptive chemical 224 may include, for example, activated carbon, silica gel, or porous aluminum oxide. In one embodiment, activated carbon may have a surface area of 300 to 2500 m2/gm. In another embodiment, the activated carbon may have a surface area of 900-1500 m2/gm.

In one embodiment of the invention, the source/drain unit 130 may also include one or more particle seals. For example, the first cavity 212 may include a first particle seal 216 on the interior of the first cavity 212 and/or a second particle seal 218 covering the exterior opening of the first channel 210. Similarly, the second cavity 222 may include a first particle seal 226 on the interior of the second cavity 222 and/or a second particle seal 228 covering the exterior opening of the second channel 220. In one embodiment of the invention, the particle seals 216, 218, 226, 228 may be expanded polytetrafluoroethylene (ePTFE).

In one embodiment of the invention, an adhesive strip 204 may be provided which may adhere to the source/drain unit 130. The adhesive strip 204 may be, for example, a pressure sensitive adhesive (PSA). The adhesive strip 204 may also act to seal the cavities 212, 222 into which the source chemical 214 and the absorptive chemical 224 are placed.

Maintaining Concentration of the Vapor within the Hard Drive

Figure 3:
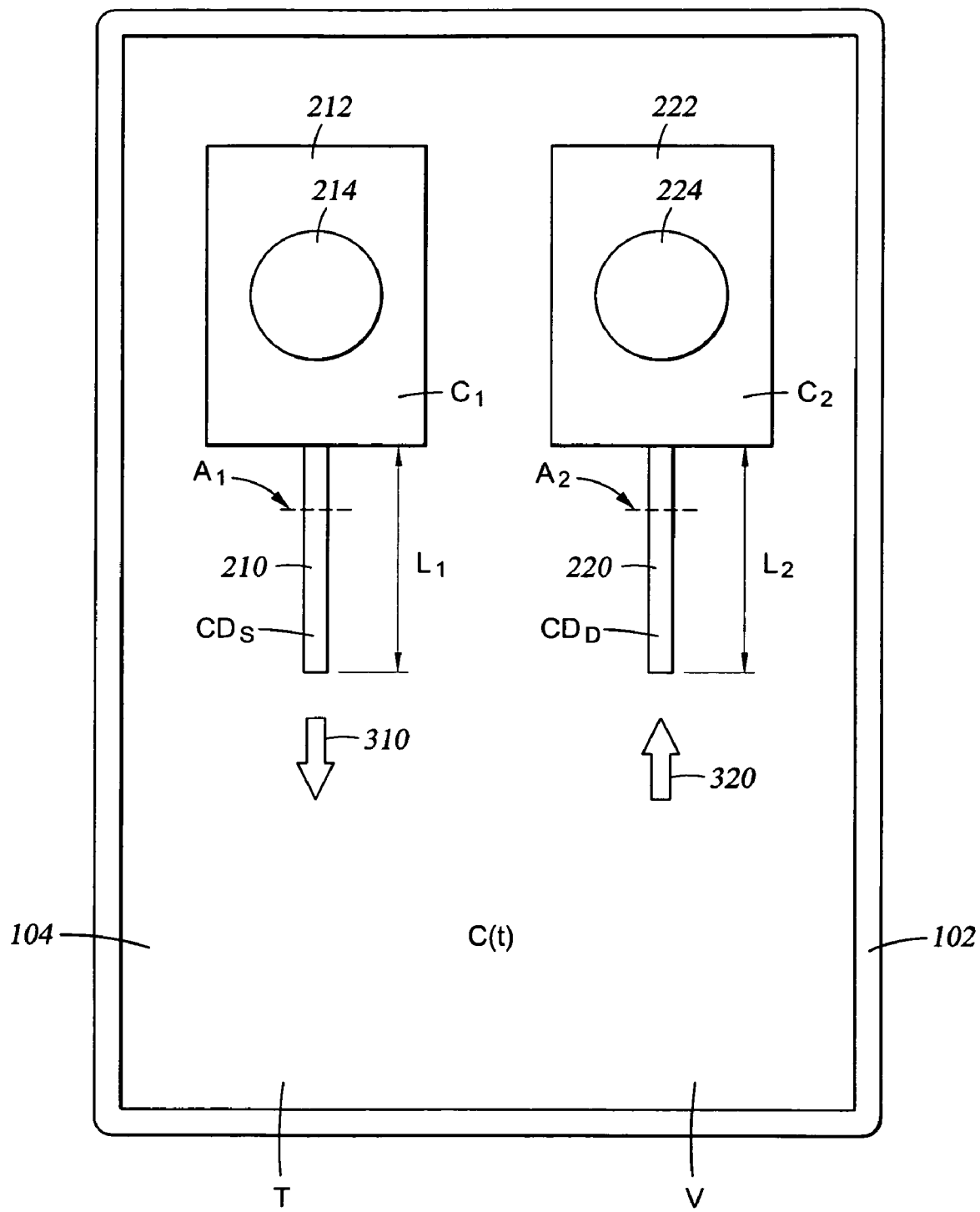
FIG. 3 is a block diagram depicting maintenance of the concentration of a vapor within the inner cavity of a hard drive housing according to one embodiment of the invention.

FIG. 3 is a block diagram depicting maintenance of the concentration of a vapor within the inner cavity 104 of a hard drive housing 102 according to one embodiment of the invention. As stated above, the partial pressure (P) and concentration (C) of the desired vapor (e.g., the vapor produced by the source chemical 212) may be used as measurements of the amount of desired vapor within the inner cavity 104 of the hard drive housing. The total pressure ($P_T$) within the inner cavity 104 may be the sum of partial pressures of each of the gasses and vapors ($P_1$, $P_2$, $P_3$, $P_4$, $P_5$ ...) within the inner cavity 104 as stated below in Formula 1.

$$P_T = P_1 + P_2 + P_3 + P_4 + P_5 \ldots \qquad \text{Formula 1.}$$

In one embodiment, Fick's First Law of Diffusion may be used to calculate the mass flow rate 310 of the vapor from the source chemical 214 into the inner cavity 104 as well as the mass flow rate 320 of the vapor to the absorptive chemical 224. For example, the change in concentration (dC/dt) of the beneficial vapor within the cavity 104 may be a function of the vapor concentration $C_1$ in the first cavity 212 (where $C_1$ is the concentration at temperature T), the vapor concentration $C_2$ in the second cavity, the conductance $CD_S$ of the first channel 210 (source conductance), the conductance 220 of the second channel $CD_D$ (drain conductance), and the volume V of the inner cavity 104. Because the second cavity 222 may contain an absorptive chemical 224, the concentration $C_2$ of the desired vapor within the second cavity 222 may effectively be zero. Applying Fick's First Law of Diffusion to FIG. 3 yields Formula 3.

$$V(dC/dt) = (C_1 - C) \times CD_S - C \times CD_D = C_1 \times CD_S - C \times (CD_S + CD_D) \qquad \text{Formula 3.}$$

From Formula 3, the concentration with respect to time of the beneficial chemical in chamber 104 may be derived to obtain Formula 4.

$$C(t) = C_1 \times [CD_S/(CD_S + CD_D)] \times [1 - \exp[-((CD_S + CD_D)/V) \times t]] \qquad \text{Formula 4.}$$

Under steady state conditions, the concentration of the desired vapor C may be described by Formula 5 and the partial pressure of the desired vapor divided by the saturation partial pressure (P/P₀) may be described by Formula 6.

$$C = C_1 \times [CD_S/(CD_S + CD_D)] \qquad \text{Formula 5.}$$

$$P/P_0 = CD_S/(CD_S + CD_D) \qquad \text{Formula 6.}$$

Thus, as depicted in formula 5, the concentration of the desired vapor may be a function of the concentration $C_1$ of the desired vapor within the first cavity 212, the conductance of the source $CD_S$, and the conductance of the drain $CD_D$. By choosing $C_1$, $CD_S$, and $CD_D$ appropriately, the concentration may be maintained at a desired level. Also, as depicted in Formula 6, the steady state partial pressure of the desired vapor divided by the saturation partial pressure ($P/P_0$) may be the ratio of the diffusion conductance of the source $CD_S$ divided by the sum of the source and sink diffusion conductances ($CD_S + CD_D$). By selecting appropriate values for $CD_S$ and $CD_D$, $P/P_0$ may be maintained at a desired level such that the partial pressure P remains below the saturation partial pressure (such that $P/P_0$ is less than 1), thereby preventing saturation of the vapor and possibly detrimental condensation of the chemical which comprises the vapor. Exemplary selection of each of the values $C_1$, $CD_S$, and $CD_D$ is also described below in greater detail.

In some cases, the source and drain conductances $CD_S$, $CD_D$ may also be adjusted to provide a desired time constant $T_C$ for the diffusion process. The time constant $T_C$ may be indicative of the amount of time needed for the concentration C and partial pressure P of the desired vapor to reach a steady state (e.g., in response to a change in ambient pressure or temperature). Formula 7 illustrates a formula for calculating the time constant $T_C$ for the diffusion process.

$$T_C = V/(CD_S + CD_D) \qquad \text{Formula 7.}$$

As depicted in Formula 7, by adjusting the total source and drain conductance ($CD_S + CD_D$), a desired time constant $T_C$ may be obtained. For example, if the total source and drain conductance ($CD_S + CD_D$) is increased, the time constant $T_C$, and thus, the amount of time to reach the steady state concentration C and partial pressure P, may decrease. In some cases, it may be desirable to provide a smaller time constant $T_C$ (and thus a smaller amount of time to reach the steady state concentration). For example, if the time constant is too long, the hard drive 100 may not sufficiently adjust to changes in operating conditions to allow the partial pressure of the vapor to reach a desired level, thereby decreasing the benefit provided by the vapor. Furthermore, after the hard drive 100 is manufactured, if the time constant $T_C$ is sufficiently large, delivery of the hard drive 100 may be impeded until the partial pressure of the vapor within the hard drive 100 reaches a desired level.

Also, as depicted in Formulas 3-7, the concentration C, the partial pressure $P/P_0$ of the beneficial vapor, and the time constant $T_C$ may be maintained independent (or essentially independent) of the temperature T within the inner cavity 104 of the hard drive housing 102.

Adjusting the Conductance of the Source and Drain

The conductances of the source and drain ($CD_S$ and $CD_D$) may be adjusted to a desired level using a variety of methods. For example, in one embodiment of the invention, the conductance of the source $CD_S$ may depend on the cross-sectional area $A_1$ and length $L_1$ of the first channel 210. Similarly, the conductance of the drain $CD_D$ may depend upon the cross-sectional area $A_2$ and length $L_2$ of the second channel 220. Specifically, the conductance of either channel may be calculated using Formula 8, depicted below.

$$CD = D \times A/L \qquad \text{Formula 8.}$$

Thus, according to formula 8, the conductance of a channel may be a diffusion constant D times the cross-sectional area A of the channel divided by the length L of the channel. By modifying $A_1$, $L_1$, $A_2$, and $L_2$, desired values for $CD_S$ and $CD_D$ may be achieved, as well as desired concentrations C and partial pressures P of the desired vapor.

Also, as described above, where channels 210, 220 are utilized, a first and/or second particle seal 216, 218 may be provided for the first channel 210 and a similar arrangement of particle seals 226, 228 may be provided for the second channel 220. In one embodiment of the invention, the particle seals 216, 218, 226, 228 provide particle control for the source and drain cavities 212, 222. Furthermore, the particle seals 216, 218, 226, 228 may also prevent turbulence in the first and second channels 210, 220, thereby providing increased consistency in conductances $CD_S$, $CD_D$ (which may, for example, be affected by such turbulence) and, as a result, increased consistency in the concentration C and partial pressure P of the desired vapor.

In some cases, the source conductance $CD_S$ and the drain conductance $CD_D$ may be adjusted without using a first and second channel 210, 220. For example, in one embodiment of the invention, microscopic pores in a media, e.g., a nuclear pore media such as a micro- or nano-porous membrane, may be utilized to change the source conductance $CD_S$ and the drain conductance $CD_D$. The media may be used to adjust the conductances for example, by covering an opening in the first cavity 212 and/or an opening in the second cavity 222 with the media. The micro- or nano-porous membrane may include ePTFE or polycarbonate with pores etched by exposure to radiation and chemical etching or equivalent processes (a variety of the latter are sold as Millipore, Nucleopore etc.). Optionally, a molecular permeable monolithic film or laminate may be utilized to adjust the source conductance $CD_S$ and the drain conductance $CD_D$. Also, a combination of the methods described above may be utilized (e.g., by selecting desired channel dimensions and additionally covering the channel with a molecular permeable monolithic film or laminate).

Exemplary Vapor Concentrations

Figure 4:
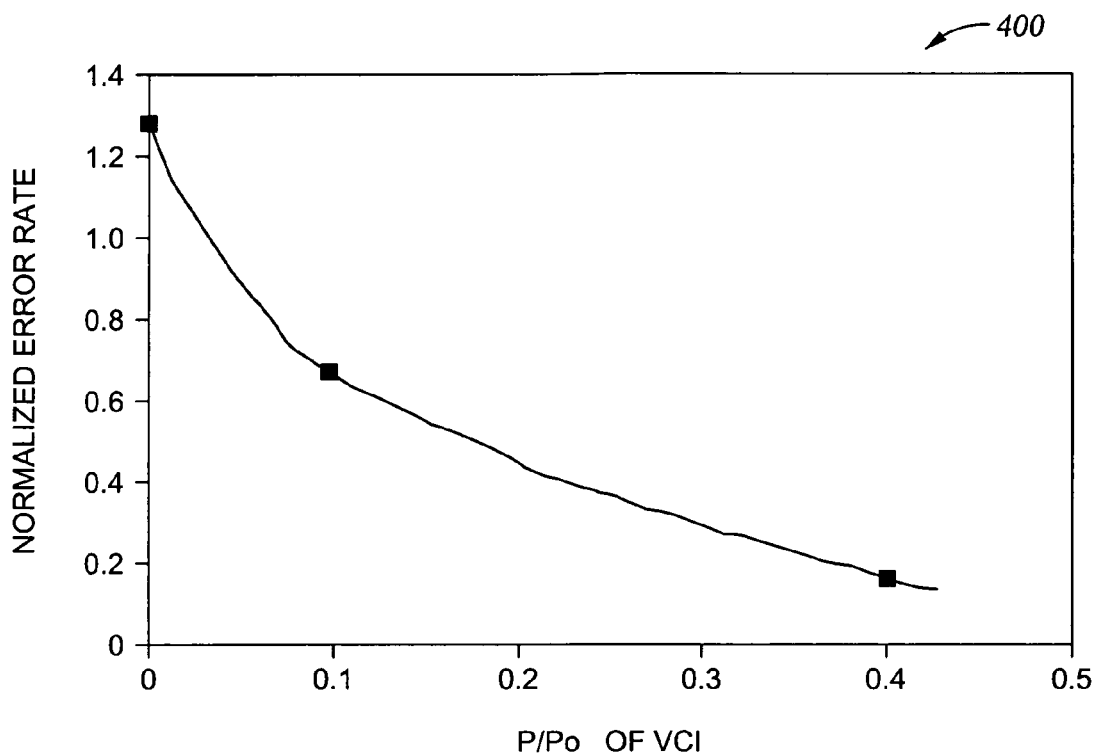
FIG. 4 is a graph depicting exemplary test results for a hard drive according to one embodiment of the invention.

In one embodiment of the invention, the hard drive 100 may be tested with a variety of partial pressure (P) values to determine an optimal partial pressure $P/P_0$ of the desired vapor to be used with the hard drive 100. For example, operation tests may be performed on the hard drive 100 (or a plurality of hard drives) to determine frequency of errors which occur within the hard drive 100 for a given partial pressure $P/P_0$ of a desired vapor, in this case, a vapor phase corrosion inhibitor VCI. FIG. 4 is a graph depicting exemplary test results 400 according to one embodiment of the invention. As depicted, the test results 400 may provide a normalized error rate for a given partial pressure $P/P_0$ of a vapor phase corrosion inhibitor VCI.

In the depicted results, the hard drive has been tested with three partial pressures, one with no vapor ($P/P_0=0$), one with $P/P_0=0.1$, and one with $P/P_0=0.4$. From the test results, a range of target partial pressures $P/P_0$ may be selected, depending, for example, on the minimum acceptable error rate for the device. For example, if a larger error rate is acceptable, (e.g., 0 to 0.8 errors under the test conditions), then the desired partial pressure range of $P/P_0$ may fall between a range of 0.1 to 0.5. Optionally, if a smaller error rate is desired, (e.g., 0 to 0.4 errors under the test conditions), then the desired partial pressure range of $P/P_0$ may fall between a range of 0.3 to 0.5. Optionally, a specific target value for $P/P_0$ may be selected (e.g., a target of $P/P_0=0.4$) and designed for. Also, in some cases, higher values of $P/P_0$ may be used. Where higher values of $P/P_0$ are used, the values may be chosen to ensure that errors from bulk condensation of the beneficial vapor onto the disk or head surface are minimized.

In addition to considering a desired partial pressure $P/P_0$ during design of the source/drain unit 130, possible leakage or reduction of the vapor produced by the source chemical 214 may be considered as well as the desired absorption of the absorptive chemical 224 in determining how much of each of the chemicals 214, 224 to use. Leakage or reduction of the vapor may occur for several reasons. For example, leakage or reduction may occur through the breather hole 106, through absorption by the absorptive chemical 224, or through other mechanisms. The leakage rate may also be affected by the volume V of the interior cavity 104 of the hard drive housing 102. If the leakage rate is large, a larger quantity of the source chemical 214 may be utilized. Similarly, if the leakage rate is small, a smaller quantity of the source chemical 214 may be utilized. An exemplary size of the source chemical 214 may be a 30 milligram (mgm) VCI tablet for a hard drive housing 102 having an inner cavity 102 of 100 cubic centimeters (cc) volume and a leakage of 0.1 cc per minute. An exemplary size for the absorptive chemical 224 may be a 60 mgm activated carbon tablet.

Figure 5:
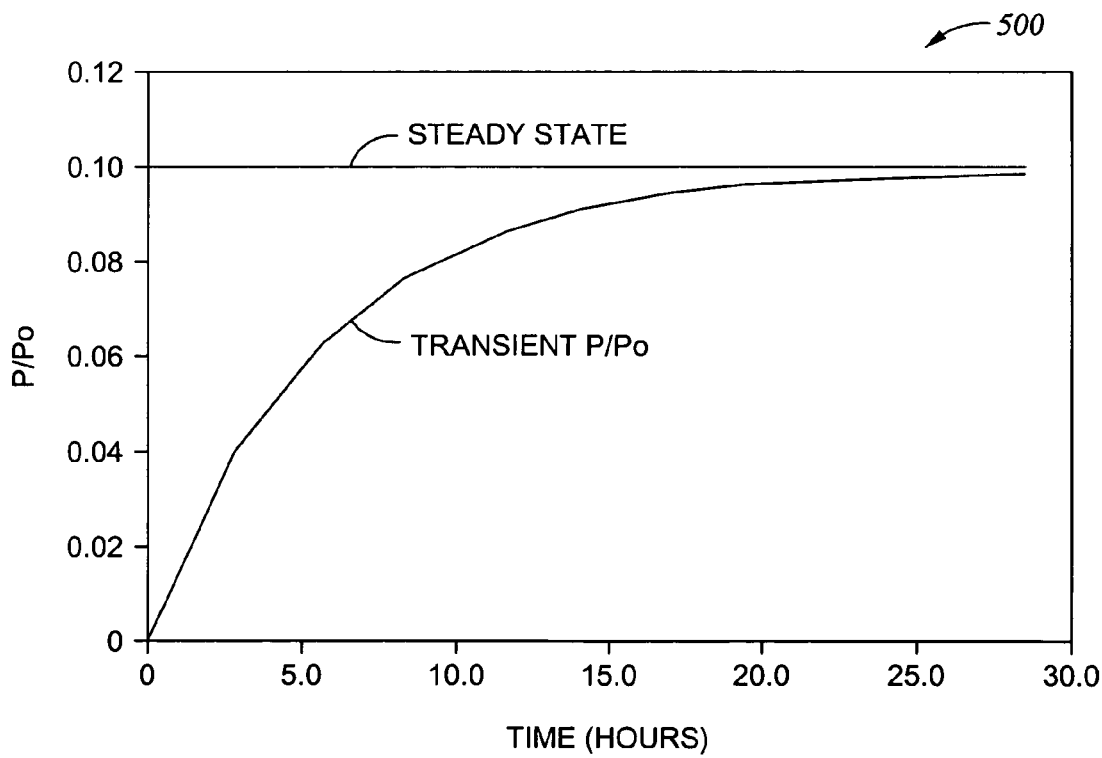
FIG. 5 is a graph depicting exemplary partial pressure values provided by s source/drain unit with respect to time according to one embodiment of the invention.

FIG. 5 is a graph depicting exemplary partial pressure values $P/P_0$ provided by a source/drain unit 130 with respect to time according to one embodiment of the invention. For example, with a desired partial pressure $P/P_0$ of 0.1 and an inner cavity 104 volume of 120 cc, the source conductance CDs may be selected as 6.0E-4 cc/sec and the drain conductance $CD_D$ may be chosen as 5.3E-3 cc/sec. As depicted, to reach a steady state concentration $P/P_0=0.1$, about 24 hours may be required. As described above, the source and drain conductances $CD_S$ and $CD_D$ may be selected to provide such a result (e.g., to provide a time constant $T_C$ which results in a steady state concentration after 24 hours). In some cases, because the steady state concentration of the vapor may be achieved within 24 hours after manufacturing of the hard drive 100, thereby providing the benefit of the vapor during operation of the hard drive 100, delivery of the hard drive 100 may not be impeded (e.g., because the steady state concentration of the vapor may be reached before the hard drive is delivered and placed into operation). Also embodiments described herein may provide a partial pressure $P/P_0$ which is essentially maintained at steady state over the operating temperature range of the hard drive 100.

Further Exemplary Embodiments

In one embodiment of the invention, the recirculation filter 110 may be a chemical recirculation filter. For example, the chemical recirculation filter may include an absorptive chemical such as activated carbon and act as a drain for the desired vapor. In such an embodiment, the drain provided by the chemical recirculation filter may replace the absorptive chemical 224 provided by the source/drain unit 130 such that the source/drain unit 130 does not include a second cavity 222 or a second channel 220. Optionally, in one embodiment, the source/drain unit 130 may include both the source chemical 214 and the absorptive chemical 224 and the recirculation filter 110 may be merely a particle recirculation filter such that the recirculation filter 110 does not contain an absorptive chemical (e.g., such that the recirculation filter 110 does not contain activated carbon).

In one embodiment of the invention, the breather filter 108 may be a dual diffusion breather filter. In some cases, the dual diffusion filter may include an absorptive chemical such as activated carbon and may thus act as a drain for the desired vapor. In one embodiment, the drain provided by the chemical recirculation filter may replace the absorptive chemical 224 provided by the source/drain unit 130 such that the source/drain unit 130 does not include a second cavity 222 or a second channel 220. Thus, the dual diffusion breather filter may be utilized to control internal absorption of the desired vapor. Optionally, in one embodiment, the source/drain unit 130 may include both the source chemical 214 and the breather filter 108 may not contain an absorptive chemical (e.g., such that the breather filter 108 does not contain activated carbon).

In some cases, an overcoat of a chemical which reduces corrosion may be applied to each hard disk 112. Where a source/drain unit 130 is utilized, the chemical overcoat may, in some cases, be thinner (e.g., than if a source/drain unit 130 was not utilized), possibly improving the magnetic read/write characteristics of the hard disk 112.

In one embodiment, the source/drain unit 130 may be used as a replacement for desiccants (e.g., a drying agent such as, for example, silica gel) within the inner cavity 104 of the hard drive housing 102 such that the inner cavity 104 of the hard drive housing 102 does not contain any desiccant. Where desiccants are not used, the source/drain unit 130 may, in some cases, be placed in a cavity in the hard drive housing 102 previously used for holding desiccants. Optionally, desiccants may be utilized in addition to the source/drain unit 130.

While described above with respect to a source/drain unit 130 which is attached separately to a hard drive housing 102, embodiments of the invention may also be utilized where the source/drain unit 130 is not separate from the hard drive housing 102 (e.g., wherein the hard drive housing 102 contains a first cavity 212 and a second cavity 222 and a first channel 210 and a second channel 212). Also, while depicted above as being adjacent to one another, the source and sink are not required to be adjacent to one another.

Also, while described above with respect to a source chemical 214 and an absorptive chemical 224, embodiments of the invention may also be utilized with multiple source chemicals and/or multiple absorptive chemicals. In one embodiment, each source chemical may be contained in one common cavity and each absorptive chemical may be contained in a separate common cavity. Optionally, separate chemicals may be maintained in separate cavities, each of which may have channels with different conductances.

While the foregoing is directed to embodiments of the present invention, other and further embodiments of the invention may be devised without departing from the basic scope thereof, and the scope thereof is determined by the claims that follow.

The invention claimed is:

1. A method for regulating the concentration of a vapor within a hard drive, the method comprising:
   providing a source chemical of a vapor in a first cavity formed within a first object;
   providing an absorptive chemical which absorbs the vapor in a second cavity formed within the first object;
   providing a third cavity formed by a hard drive housing of the hard drive, wherein a first conductance path having a first conductance connects the first cavity to the third cavity, wherein a second conductance path having a second conductance connects the second cavity to the third cavity, and wherein the first conductance and the second conductance maintain a partial pressure level of the vapor within the third cavity.

2. The method of claim 1, wherein the first object is the hard drive housing.

3. The method of claim 1, wherein the first object is a separate unit from the hard drive housing, wherein the first cavity and the second cavity are formed within the separate unit.

4. The method of claim 1, wherein the vapor is one of a corrosion inhibiting vapor, a lubricating vapor, and a smear inhibiting vapor.

5. The method of claim 1, further comprising:
   providing a particle recirculation filter within the third cavity which does not contain the absorptive chemical.

6. The method of claim 1, wherein the partial pressure level of the vapor within the third cavity is below a threshold level of partial pressure for saturation of the vapor.

7. The method of claim 1, wherein the first conductance and the second conductance comprise one of conductance channels having a particle filter at one of one end and both ends of each channel, a porous membrane, and a molecular permeable monolithic film.

8. A hard drive comprising:
   a first cavity formed within a first object, wherein the first cavity includes a source chemical which provides a vapor;
   a second cavity formed within the first object, wherein the second cavity includes an absorptive chemical which absorbs the vapor;
   a hard drive housing including a third cavity formed within the hard drive housing;
   a first conductance path between the first cavity and the third cavity, wherein the first conductance path has a first conductance; and
   a second conductance path between the second cavity and the third cavity, wherein the second conductance path has a second conductance, and wherein the first conductance and the second conductance maintain a partial pressure level of the vapor within the third cavity.

9. The hard drive of claim 8, wherein the first object is the hard drive housing.

10. The hard drive of claim 8, wherein the first object is a separate unit from the hard drive housing, wherein the first cavity and the second cavity are formed within the separate unit.

11. The hard drive of claim 10, further comprising:
    an adhesive strip which adheres to the separate unit and covers at least a portion of the first cavity and the second cavity.

12. The hard drive of claim 8, wherein the vapor is one of a corrosion inhibiting vapor, a lubricating vapor, and a smear inhibiting vapor.

13. The hard drive of claim 8, further comprising:
    a particle recirculation filter within the third cavity which does not contain the absorptive chemical.

14. The hard drive of claim 8, further comprising:
    a breather hole formed by the hard drive housing, wherein the breather hole extends from the third cavity to an exterior portion of the hard drive housing; and
    a dual diffusion breather filter covering the breather hole.

15. The hard drive of claim 8, wherein the first conductance and the second conductance comprise a first conductance channel and a second conductance channel, respectively, wherein the first conductance channel includes a first particle filter at an end of the first conductance channel, and wherein the second conductance channel includes a second particle filter at an end of the second conductance channel.

16. The hard drive of claim 8, wherein the hard drive housing does not contain a desiccant.

17. A hard drive comprising:
    a source/drain unit including:
       a first cavity formed within the source/drain unit, wherein the first cavity includes a chemical which provides a corrosion inhibiting vapor; and
       a second cavity formed within the source/drain unit, wherein the second cavity includes an activated carbon which absorbs the corrosion inhibiting vapor;
    a hard drive housing including a third cavity formed within the hard drive housing;

a first conductance channel between the first cavity and the third cavity, wherein the first conductance path has a first conductance; and a second conductance channel between the second cavity and the third cavity, wherein the second conductance path has a second conductance, and wherein the first conductance and the second conductance maintain a partial pressure level of the corrosion inhibiting vapor within the third cavity.

18. The hard drive of claim 17, wherein the chemical contains a benzotriazol unit, the unit having unsubstituted N—H bond on the triazole ring.

19. The hard drive of claim 18, wherein the chemical is a mixture of two or more chemical compounds, with at least one of them containing a benzotriazole unit, the unit having unsubstituted N—H bond on the triazole ring.

20. The hard drive of claim 17, wherein the chemical comprises one of benzotriazole, 5 methyl benzotriazole, and 4 methyl benzotriazole.

21. The hard drive of claim 17, wherein the chemical comprises a mixture of two of benzotriazole, 5 methyl benzotriazole, and 4 methyl benzotriazole.

22. The hard drive of claim 17, wherein the chemical comprises a mixture of benzotriazole, 5 methyl benzotriazole, and 4 methyl benzotriazole.

23. The hard drive of claim 17, wherein the chemical comprises one of 4 ethyl benzotriazole, 5 ethyl benzotriazole, 4 butyl benzotriazole, and 5 butyl benzotriazole.

24. The hard drive of claim 17, further comprising:
    an adhesive strip which adheres to the source/drain unit and covers at least a portion of the first cavity and the second cavity.

25. The hard drive of claim 17, wherein a first particle filter covers a first end of the first conductance channel, and wherein a second particle filter covers a first end of the second conductance filter.

* * * * *